(12) United States Patent
Zhao et al.

(10) Patent No.: US 11,999,211 B2
(45) Date of Patent: Jun. 4, 2024

(54) VEHICLE ACTIVE SUSPENSION INERTIA REGULATION METHOD BASED ON WHEEL SUPPORTING FORCE, AND CONTROL SYSTEM

(71) Applicant: Yanshan University, Qinhuangdao (CN)

(72) Inventors: Dingxuan Zhao, Qinhuangdao (CN); Shuang Liu, Qinhuangdao (CN); Mingde Gong, Qinhuangdao (CN); Zhuxin Zhang, Qinhuangdao (CN); Zhiguo Sun, Qinhuangdao (CN); Bin Yang, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 18/320,230

(22) Filed: May 19, 2023

(65) Prior Publication Data

US 2023/0286345 A1    Sep. 14, 2023

Related U.S. Application Data

(63) Continuation of application No. PCT/CN2022/085567, filed on Apr. 7, 2022.

(30) Foreign Application Priority Data

Jun. 26, 2021  (CN) .......................... 202110714847.6

(51) Int. Cl.
*B60G 17/016* (2006.01)
*B60G 17/015* (2006.01)
(Continued)

(52) U.S. Cl.
CPC ..... *B60G 17/0164* (2013.01); *B60G 17/0155* (2013.01); *B60G 17/0165* (2013.01);
(Continued)

(58) Field of Classification Search
None
See application file for complete search history.

(56) References Cited

U.S. PATENT DOCUMENTS 6,604,036 B2   8/2003   Pallot
9,702,349 B2   7/2017   Anderson et al.
(Continued)

FOREIGN PATENT DOCUMENTS

CN   103182916 A   7/2013
CN   107791773 A   3/2018
(Continued)

*Primary Examiner* — Lail A Kleinman
(74) *Attorney, Agent, or Firm* — True Shepherd LLC; Andrew C. Cheng

(57) ABSTRACT

An inertial regulation method and control system of vehicle active suspension based on a supporting force of each wheel comprises an inner loop control and an outer loop control. The inner loop control is to calculate, according to the dynamics, a theoretical supporting force of each wheel when the vehicle is driving on a virtual slope plane with a 6-dimensional acceleration and a pitch angle measured by an inertial measurement unit; compare the theoretical supporting force with the measured supporting force of each wheel; and control the expansion of each suspension cylinder according to the difference value, so that the supporting force of each wheel changes according to the theoretical supporting force. The outer loop control is to control each suspension cylinder for the same expansion of displacement, so that the average value of all the suspension cylinder strokes tends to a median value.

9 Claims, 11 Drawing Sheets

(51) Int. Cl.
*B60G 17/0165* (2006.01)
*B60G 17/018* (2006.01)
*B60G 17/019* (2006.01)

(52) U.S. Cl.
CPC ..... *B60G 17/018* (2013.01); *B60G 17/01933* (2013.01); *B60G 2202/242* (2013.01); *B60G 2400/25* (2013.01)

(56) References Cited

U.S. PATENT DOCUMENTS

| | | | |
|---|---|---|---|
| 11,326,985 | B2 | 5/2022 | Zhao et al. |
| 2020/0114721 | A1* | 4/2020 | Tanzan ............... B60G 17/0157 |
| 2023/0271469 | A1* | 8/2023 | Birch .................... B60G 17/02 701/23 |

FOREIGN PATENT DOCUMENTS

| | | |
|---|---|---|
| CN | 110281722 A | 9/2019 |
| CN | 110281726 A | 9/2019 |
| CN | 110281727 A | 9/2019 |
| CN | 112776551 A | 5/2021 |
| CN | 113370735 A | 9/2021 |
| EP | 1440826 A2 | 7/2004 |

* cited by examiner

VEHICLE ACTIVE SUSPENSION INERTIA REGULATION METHOD BASED ON WHEEL SUPPORTING FORCE, AND CONTROL SYSTEM

CROSS-REFERENCE TO RELATED APPLICATIONS

This application is a continuation of International Patent Application No. PCT/CN2022/085567 with a filing date of Apr. 7, 2022, designating the United States, and further claims priority to Chinese Patent Application No. 202110714847.6 with a filing date of Jun. 26, 2021. The content of the aforementioned applications, including any intervening amendments thereto, are incorporated herein by reference.

FIELD OF TECHNOLOGY

The present invention relates to a control method and control system of vehicle active suspension, and in particular to a method for regulating inertia of a vehicle active suspension system by controlling a supporting force of each wheel and a corresponding control system thereof.

BACKGROUND OF THE PRESENT INVENTION

A suspension system is an important part of a vehicle chassis, and its performance directly determines the driving comfort and handling stability of a vehicle. Most traditional vehicles employ passive suspension, of which suspension parameters are designed according to specific road conditions. Once selected, it is difficult to change, and cannot change with the road conditions, speed of the vehicle, etc., thus limiting the further improvement of the driving performance of the vehicle.

Active suspension is computer-controlled suspension developed in recent years. The active suspension can automatically adjust the stiffness and damping of the suspension or control the expansion of the suspension according to changes in vehicle weight, road conditions or jolt and vibration, a driving speed, operating conditions such as acceleration, braking, driving, steering, so as to meet the requirements of the driving comfort and handling stability of the vehicle.

The active suspension technology mainly comprises an active suspension system and a control method.

The active suspension system comprises a device that provides energy for the active suspension and an additional device that can control the force or displacement. According to the different ways of energy supply, it can be divided into a hydraulic drive, a pneumatic drive and an electric drive. The hydraulic drive suspension system is widely used because of its high power density, convenient layout and installation. The pneumatic drive suspension system has also been used to a certain extent because of its advantages such as soft driving and no pollution.

Even for the same active suspension system, if different control methods are used, it would produce different control effects. The current control methods of active suspension mainly comprise: ceiling damping control, optimal control, preview control, adaptive control, fuzzy control, neural network control, sliding mode control, immune evolution control, etc.

According to records, no matter which control method is employed, the performance of the vehicle has been improved to varying degrees, but there are still some problems that have not been well solved, among which the more prominent one is the difficulty in coordinating the driving comfort control and handling stability control. The vehicle driving comfort control and handling stability control are two important aspects to be considered in a suspension design. Most of the existing research results are based on the establishment of different mathematical models according to different needs, which are designed independently, and the overall performance of the vehicle is considered as the sum of the performances of these subsystems. Or a mathematical model can be broken down and then combined together for control. When the mathematical model is established, the designs of the driving comfort control and handling stability control are not considered at the same time. The design process is complicated and it is difficult to obtain a good control effect.

SUMMARY OF PRESENT INVENTION

In order to solve the prominent problems existing in the vehicle active suspension technology, the present invention provides an inertial control method and control system of vehicle active suspension based on a supporting force of each wheel, which specifically comprises the following two aspects.

In a first aspect of the present invention, provided is an inertial regulation method of vehicle active suspension based on a supporting force of each wheel, wherein the method comprises adjusting the supporting force of each wheel and controlling the expansion of each suspension cylinder to control a resultant force received by the vehicle in a vertical direction, and respective resultant torques around the longitudinal axis and horizontal axis passing through the center of mass are equal to zero or close to zero, so that the center of mass of the vehicle moves along a straight line or smooth curve, and the attitude of the vehicle remains basically stable.

The inertial regulation method comprises an inner loop control and an outer loop control, wherein the inner loop control is used to control the supporting force of each wheel, and the outer loop control is used to control an average value of all suspension cylinder strokes, the inner loop control and the outer loop control are independent of each other and have no coupling relationship.

The inner loop control is to: calculate, according to the dynamics, a theoretical supporting force $W_i$ that each wheel should bear when the vehicle is driving on a virtual slope plane with a 6-dimensional acceleration, pitch angle and roll angle measured by an inertial measurement unit, which is taken as a control target value of supporting force of each wheel; compare the theoretical supporting force with the measured supporting force $W_i^C$ of each wheel; input the difference $\Delta W_i = W_i - W_i^C$ thereof to a servo controller as an adjustment quantity to control the expansion of the suspension cylinder, so that the supporting force of each wheel changes according to the theoretical supporting force $W_i$. Wherein i=1, 2, ... m, m is the number of wheels.

The outer loop control is to: calculate the average value of all the suspension cylinder strokes based on each measured suspension cylinder stroke, compare the average value of all the suspension cylinder strokes with a median value of the suspension cylinder strokes, take the difference thereof as a target displacement, and control each suspension cylinder for the same expansion of displacement, so that the average value of all the suspension cylinder strokes tends to the median value.

Further, the inner loop control and outer loop control are finally realized by controlling the displacement of each suspension cylinder, the displacement of each suspension cylinder in the inner loop control and the displacement of each suspension cylinder in the outer loop control are superimposed together at an input end of the servo controller of each suspension cylinder.

In a second aspect of the present invention, provided is a control system applying the above-mentioned inertial control method of vehicle active suspension based on a supporting force of each wheel. As shown in FIG. 1, the control system comprises a vehicle body 1, m wheels 2-1, 2-2, ..., 2-m, an inertial measurement unit 3, suspension cylinders 4-1, 4-2, ..., 4-m corresponding to the wheels and displacement sensors 5-1, 5-2, ..., 5-m and supporting force sensors 6-1, 6-2, ..., 6-m, servo controllers 7-1, 7-2, ..., 7-m, and an electronic control unit 8, etc. Wherein the displacement sensors 5-1, 5-2, ..., 5-m and the supporting force sensors 6-1, 6-2, ..., 6-m are respectively installed in the suspension cylinders 4-1, 4-2, ..., 4-m and are used to measure the stroke and supporting force of each suspension cylinder. The electronic control unit 8 is communicatively connected with the inertial measurement unit 3, the displacement sensors 5-1, 5-2, ..., 5-m and the supporting force sensors 6-1, 6-2, ..., 6-m on the suspension cylinders and the servo controllers 7-1, 7-2, ..., 7-m. The servo controllers 7-1, 7-2, ..., 7-m are respectively connected with the suspension cylinders 4-1, 4-2, ..., 4-m to drive the suspension cylinders.

Further, the supporting force sensors are installed at the positions where the suspension cylinders are connected with the vehicle body; or a supporting force sensor is installed on each of a rod cavity loop and a rod-free cavity loop of the suspension oil cylinder/gas cylinder.

In another implementation, proposed in the present invention is an inertial regulation method of vehicle active suspension based on a supporting force of each wheel, wherein the control method comprises an inner loop control for controlling a vertical supporting force of each wheel and an outer loop control for controlling the average value of all suspension oil cylinder strokes.

The inner loop control comprises: calculating an actual vertical supporting force $W_i^C$ of each wheel according to a measured vertical supporting force of each suspension cylinder; calculating, according to the measured 6-dimensional acceleration in a vehicle coordinate system and the pitch angle and the roll angle of the vehicle body, a theoretical vertical supporting force $W_i$ that each wheel should bear when the vehicle is driving on a virtual slope plane; taking the theoretical vertical supporting force $W_i$ of each wheel as a control target value of the actual vertical supporting force $W_i^C$; obtaining an adjustment quantity $\Delta W_i = W_i - W_i^C$ after calculating the difference between the theoretical vertical supporting force and the actual vertical supporting force, which is input to the servo controller as an expansion adjustment quantity of the suspension oil cylinder, so as to drive the extension or retraction of the suspension oil cylinder.

The outer loop control is to: calculate the average value of the suspension oil cylinder strokes according to a measured stroke of each suspension oil cylinder, compare the average value with a median stroke of each suspension oil cylinder, and take the difference between the median stroke and the mean stroke of each suspension oil cylinder as a target value of the unified expansion of each suspension oil cylinder, so that each suspension oil cylinder is extended or retracted with the same displacement and the average value of the suspension oil cylinder strokes is equal to the median stroke of the suspension oil cylinder.

By adjusting the vertical supporting force of each wheel and controlling the expansion of each suspension oil cylinder, a resultant force received by the vehicle in a vertical direction, and respective resultant torques around the longitudinal axis and horizontal axis passing through the center of mass are equal to zero or close to zero under the action of various forces comprising a driving force, a driving resistance, a lateral force, a gravity, an inertia force and a vertical supporting force of each wheel, so that the center of mass of the vehicle moves along a straight line or a smooth curve and the attitude of the vehicle keeps basically stable.

Further, in the process of determining the theoretical vertical supporting force of each wheel, a fixed coordinate system OXYZ and a vehicle coordinate system oxyz are established as shown in FIG. 3. The positive direction of X-axis of the fixed coordinate system OXYZ is a transverse direction of the vehicle, the positive direction of Y-axis is a longitudinal forward direction of the vehicle, and the positive direction of Z-axis is a vertical upward direction of the vehicle. The fixed coordinate system OXYZ is fixed to the virtual slope plane. The vehicle coordinate system oxyz is fixed to the vehicle and coincides with the fixed coordinate system OXYZ at their initial positions. Setting the positioning coordinates of the vehicle coordinate system in the fixed coordinate system respectively as x, y, z, $\alpha$, $\beta$, $\gamma$; setting the weight of the vehicle as M, the center of mass of the vehicle in the vehicle coordinate system oxyz as W ($x_W$, $y_W$, $z_W$), the x and y coordinates of a supporting point $O_i$ of the suspension numbered i in the vehicle coordinate system respectively as $b_i$ and $L_i$; setting the moments of inertia of the vehicle with respect to the x, y and z axises of the coordinate system as $J_{XX}$, $J_{YY}$ and $J_{ZZ}$, and the products of inertia with respect to x/y, y/z and x/z axises as $J_{XY}$, $J_{YZ}$ and $J_{XZ}$. Setting the 6-dimensional accelerations of the vehicle coordinate system in the virtual slope plane are $\ddot{x}$, $\ddot{y}$, $\ddot{z}$, $\ddot{\alpha}$, $\ddot{\beta}$, $\ddot{\gamma}$, and the measured attitude angles of the vehicle body are $\alpha$ and $\beta$.

Further, in order to reflect the influence of slope on the actual vertical supporting force of each wheel, the slope angle $\lambda$ is the included angle between the normal line and the plumb line of the virtual slope plane, and the vehicle driving azimuth angle $\varphi$ is the included angle between the gradient descending direction of the virtual slope and the x axis of the vehicle coordinate system. The formulas for calculating the slope angle $\lambda$ and vehicle driving azimuth angle $\varphi$ from $\alpha$ and $\beta$ are as follows:

$$\lambda = \tan^{-1}\sqrt{T_X^2 + T_Y^2} \qquad (1)$$

$$\varphi = \begin{cases} -\tan^{-1}\dfrac{T_X}{T_Y}, \beta > 0 \\ -\dfrac{\pi}{2}\mathrm{sgn}\ \alpha, \beta = 0 \\ \pi - \tan^{-1}\dfrac{T_X}{T_Y}, \beta < 0 \end{cases} \qquad (2)$$

In the formulas, $T_X = \tan \alpha$, $T_Y = \tan \beta/\cos \alpha$.

Further, in order to solve the theoretical vertical supporting force of each wheel, setting the driving force of wheel i at the ground point of the virtual slope plane as $P_i$, the driving resistance as $F_i$, the lateral force as $S_i$, and the vertical supporting force of the wheel as $W_i$, and then obtaining, by establishing and solving the dynamic equation, the theoretical vertical supporting force $W_i$ of the wheel as follows:

$$W_i = \{1\ L_i - b_i\}[H]^{-1}\{A\} \qquad (3)$$

Wherein, $$[H] = \begin{bmatrix} 6 & \sum_{i=1}^{6} L_i & -\sum_{i=1}^{6} b_i \\ \sum_{i=1}^{6} L_i & \sum_{i=1}^{6} L_i^2 & -\sum_{i=1}^{6} L_i b_i \\ -\sum_{i=1}^{6} b_i & -\sum_{i=1}^{6} L_i b_i & \sum_{i=1}^{6} b_i^2 \end{bmatrix}$$

$$\{A\} = \begin{Bmatrix} -Mg\cos\lambda - M\ddot{z} - My_W\ddot{\alpha} + Mx_W\ddot{\beta} \\ -Mg(z_W\sin\lambda\sin\varphi + y_W\cos\lambda) + Mz_W\ddot{y} - My_W\ddot{z} - \\ [J_{XX} + M(y_W^2 + z_W^2)]\ddot{\alpha} + (My_W x_W + J_{XY})\ddot{\beta} + (Mx_W z_W + J_{XZ})\ddot{\gamma} \\ Mg(z_W\sin\lambda\cos\varphi + x_W\cos\lambda) - Mz_W\ddot{x} + Mx_W\ddot{z} + (J_{XY} + Mx_W y_W)\ddot{\alpha} - \\ [J_{YY} + M(x_W^2 + z_W^2)]\ddot{\beta} + (J_{YZ} + My_W z_W)\ddot{\gamma} \end{Bmatrix}$$

In each formula, i=1, 2, 3, . . . , m.

Further, according to the above-mentioned inertial regulation method of vehicle active suspension based on a supporting force of each wheel, the inner loop control and outer loop control are independent of each other and have no coupling relationship. Both the inner loop control and outer loop control for controlling the supporting force are realized by controlling the stroke displacement of the suspension oil cylinder. The displacement of the suspension oil cylinder for the inner loop control and the displacement of the suspension oil cylinder for the outer loop control are superimposed at the input end of the servo controller of each suspension oil cylinder.

Also proposed in the present invention is a control system applying the inertial regulation method of vehicle active suspension based on a supporting force of each wheel, wherein the control system comprises a vehicle body, an inertial measurement unit, an electronic control unit, wheels, suspension oil cylinders corresponding to the wheels, displacement sensors and supporting force sensors corresponding to the suspension oil cylinders and servo controllers; the inertial measurement unit, the electronic control unit and the servo controllers are fixed on the vehicle body, the wheels are connected to the vehicle body by the suspension oil cylinders, and the displacement sensors and the supporting force sensors are connected to the suspension oil cylinders and used to measure the stroke and the supporting force of each suspension oil cylinder; the electronic control unit is communicatively connected with the inertial measurement unit, the displacement sensors and the supporting force sensors of the suspension oil cylinders, and the servo controllers; and each servo controller is connected with the corresponding suspension oil cylinder to drive the suspension oil cylinder.

Further, the supporting force sensors are installed at the positions where the suspension oil cylinders are connected with the vehicle body; or a supporting force sensor is installed on each of a rod cavity oil line and a rod-free cavity oil line of the suspension oil cylinder.

Compared with the existing active suspension technology, the inertial regulation active suspension control method and suspension control system based on a supporting force of each wheel proposed in the present invention have the following advantages:

(1) The coordination and unity of driving comfort control and handling stability control are well realized. In the present invention, the method comprises adjusting the supporting force of each wheel and controlling the expansion of each suspension cylinder to control a resultant force received by the vehicle in a vertical direction, and respective resultant torques around the longitudinal axis and horizontal axis passing through the center of mass to be equal to zero or close to zero, so that the center of mass of the vehicle moves along a straight line or smooth curve, and the attitude of the vehicle remains basically stable.

(2) The vehicle is made to consume less energy when driving on an uneven road surface. Because the rise and fall of the center of mass and the jolting and swaying of the attitude when driving the vehicle would consume a lot of energy, compared with the existing active suspension control method, the present invention can make the track of the center of mass of the vehicle driving on the uneven road surface smoother, and the amplitude of the swaying of the attitude is significantly reduced. Therefore, the energy consumed by driving the vehicle can be effectively reduced.

The application practice shows that the active suspension system based on the present invention can effectively restrain the disturbance caused by uneven ground, geological soft and hard changes, acceleration/braking and steering on the smooth driving of the vehicle, and significantly improve the driving comfort and handling stability of the vehicle on the complex road conditions.

DESCRIPTION OF THE EMBODIMENTS

Figure 1:
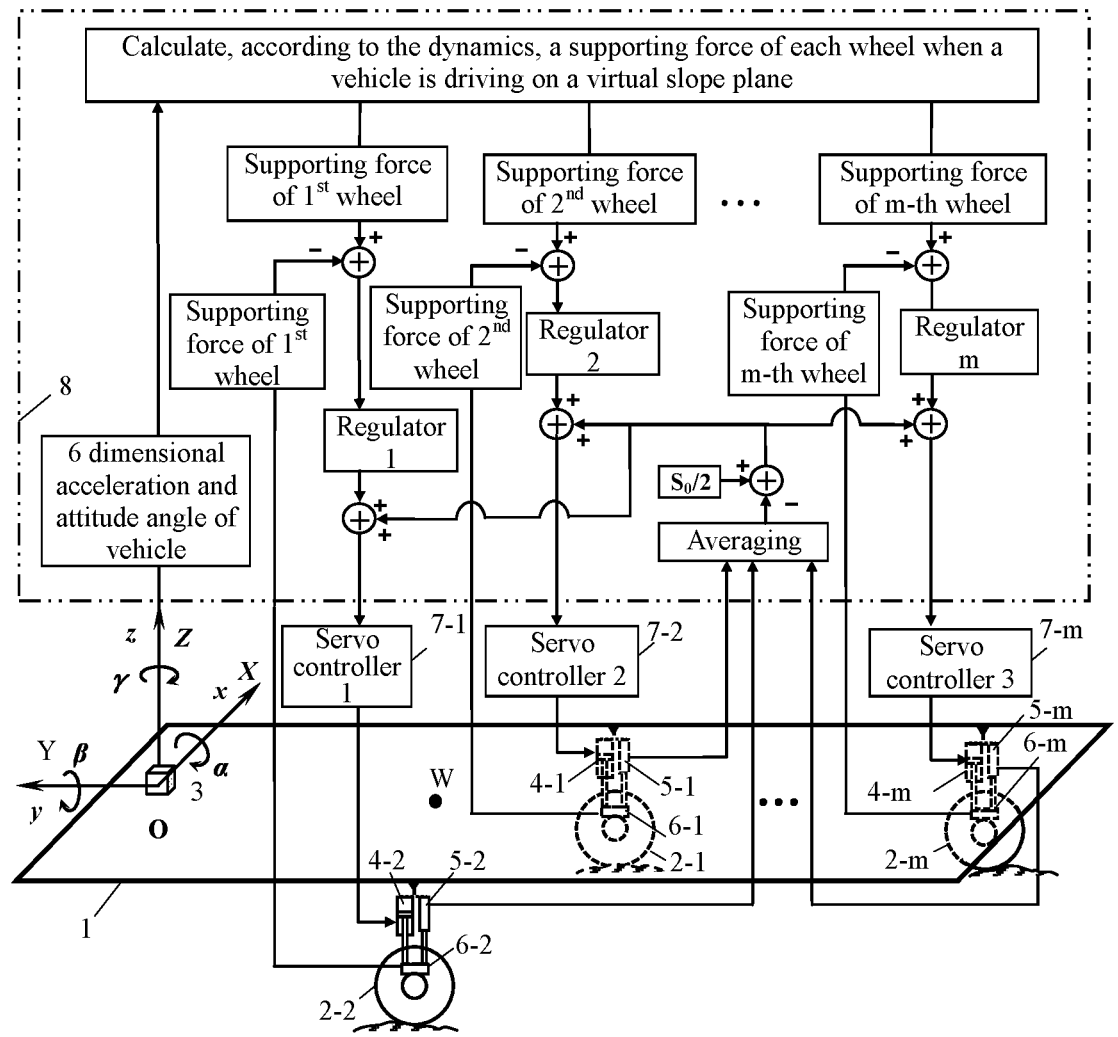
FIG. 1 is a structural schematic diagram of an inertial regulation active suspension control system based on a supporting force of each wheel in the present invention.

The academic idea of the present invention is put forward according to the principle of vehicle dynamics. The reason why a vehicle can drive at a speed higher than 120 km/h on a highway road is mainly because the road surface is very flat. Constrained by the ground plane, the center of mass of the vehicle can only move along a straight line or a smooth curve and the vehicle maintains a stable attitude.

According to Newton's first law, in order to make the center of mass of the vehicle move along the straight line or the smooth curve when driving on an uneven road surface and the vehicle maintain the stable attitude, it is necessary to obtain the same force as that of the vehicle driving on a flat road, and it is necessary to at least ensure that a resultant force received by the vehicle in a vertical direction, and respective resultant torques around the longitudinal axis and horizontal axis passing through the center of mass are equal to zero or close to zero. On this basis, the present invention proposes the principle of inertia regulation of active suspension based on a supporting force of each wheel: by adjusting the supporting force of each wheel, a resultant force received by the vehicle in a vertical direction, and respective resultant torques around the longitudinal axis and horizontal axis passing through the center of mass are equal to zero or close to zero under the action of various forces comprising a driving force of each wheel, a driving resistance, a lateral force, a gravity, and an inertia force.

In order to find a supporting force control target value of each wheel that meets the above-mentioned requirements, the present invention proposes an idea, that is, to design a virtual slope plane, where the pitch angle, roll angle and 6-dimensional acceleration at the center of mass of the vehicle driving on the virtual slope plane are equal to the values measured when the vehicle is driving on the uneven road surface. Due to the constraints of the slope plane, when the vehicle is driving on it, the center of mass would move along a straight line or a smooth curve and keep the attitude basically stable, which means that a resultant force received by the vehicle in a vertical direction, and respective resultant torques around the longitudinal axis and horizontal axis passing through the center of mass are equal to zero or close to zero when the vehicle is driving on the virtual slope plane. Therefore, the supporting force received by each wheel when the vehicle is driving on the virtual slope plane is suitable as the control target value of the supporting force of each wheel when the vehicle is driving on the uneven road surface.

Practice has proved that the above academic idea is correct, but there is a problem in the practical application, that is, the suspension control is only the supporting force control of each wheel, and there is no suspension stroke control. Therefore, as the time goes on, some or all of the suspension cylinder strokes may reach an extreme stroke, which would make the riding comfort and driving comfort of the vehicle seriously deteriorated.

Because in the control process, the displacement of the suspension cylinder in each scanning cycle is far less than the height of the center of mass of the vehicle, in the same scanning period, when each suspension cylinder is extended and retracted according to the same displacement, it can be considered that it would not affect the various forces of the vehicle, comprising the supporting force of each wheel. If the average stroke can always be controlled in the median value of the suspension strokes by means of unified expansion of the same displacement of each suspension, it can not only eliminate, to the greatest extent, the deterioration of riding comfort and driving comfort caused by the oil cylinder stroke reaching the extreme stroke, but also improve the adaptability of the vehicle to the future uneven road surface. Therefore, in addition to the supporting force control of the wheel, the present invention also introduces the control of the average suspension stroke. The former is called an inner loop control, while the latter is called an outer loop control. They are independent of each other and have no coupling relationship.

In the following, taking a three-axle (6-wheel) vehicle as an example, and illustrative embodiments, features and methods of the present invention are described in detail with reference to the accompany drawings. Other vehicles with three or more wheels can be constructed in the same way as in this example.

1. A Hardware Structure of an Active Suspension Control System

Figure 2:
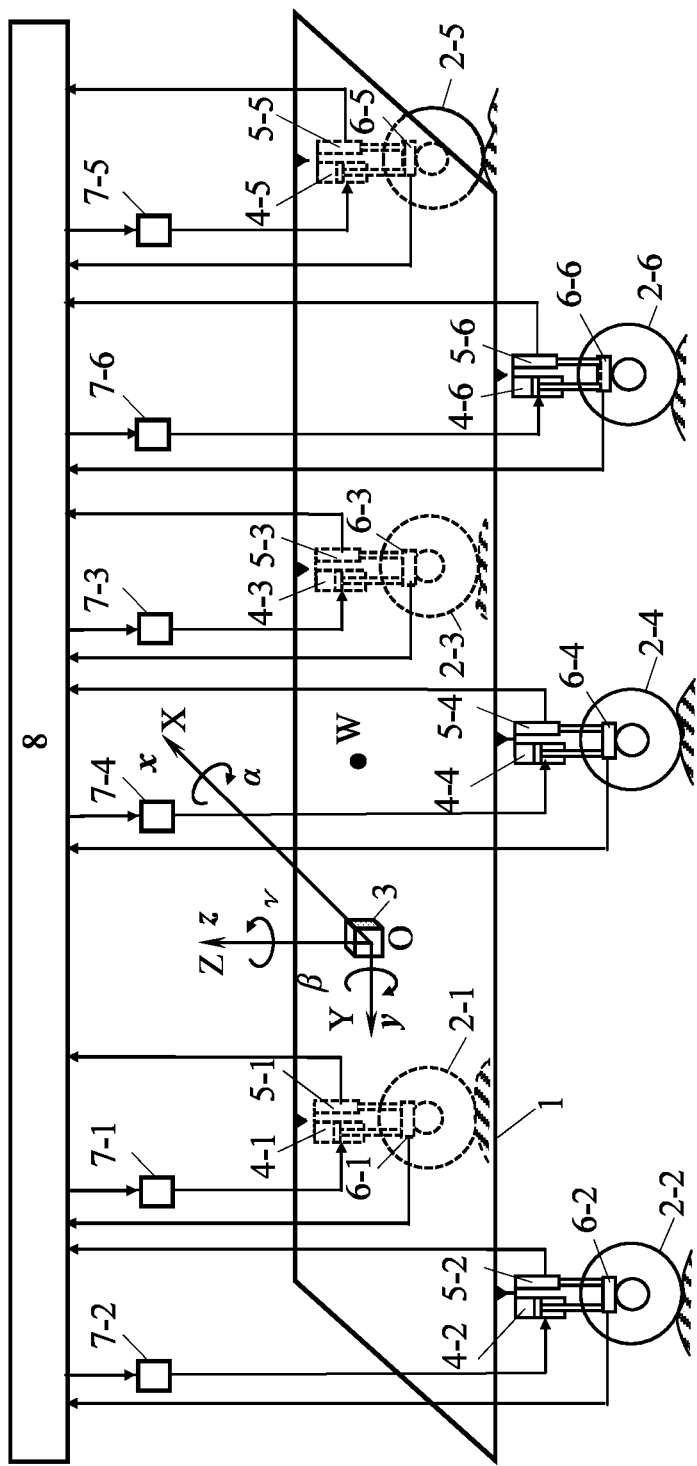
FIG. 2 is a structural schematic diagram of an inertial regulation active suspension control system of a three-axle vehicle based on a supporting force of each wheel in the present invention.

The inertial regulation active suspension control system of a three-axle (six-wheel) vehicle based on the supporting force of each wheel is shown in FIG. 2, which employs the form of hydraulic servo drive. The system comprises a vehicle body 1, 6 wheels 2-1, 2-2, . . . , 2-6, an inertial measurement unit 3, suspension oil cylinders 4-1, 4-2, . . . , 4-6 corresponding to the wheels and displacement sensors 5-1, 5-2, . . . , 5-6 and supporting force sensors 6-1, 6-2, . . . , 6-6, servo controllers 7-1, 7-2, . . . , 7-6, and an electronic control unit 8, etc. Wherein the displacement sensors 5-1, 5-2, . . . , 5-6 and supporting force sensors 6-1, 6-2, . . . , 6-6 are respectively installed in the suspension oil cylinders 4-1, 4-2, . . . , 4-6 and are used to measure the stroke and supporting force of each suspension cylinder. The electronic control unit 8 is connected with the inertial measurement unit 3, the displacement sensors 5-1, 5-2, . . . , 5-6 and the supporting force sensors 6-1, 6-2, . . . , 6-6 on the suspension oil cylinders and the servo controllers 7-1, 7-2, . . . , 7-6. The servo controllers 7-1, 7-2, . . . , 7-6 are respectively connected with the suspension oil cylinders 4-1, 4-2, . . . , 4-6 to drive the suspension oil cylinders.

Figure 3:
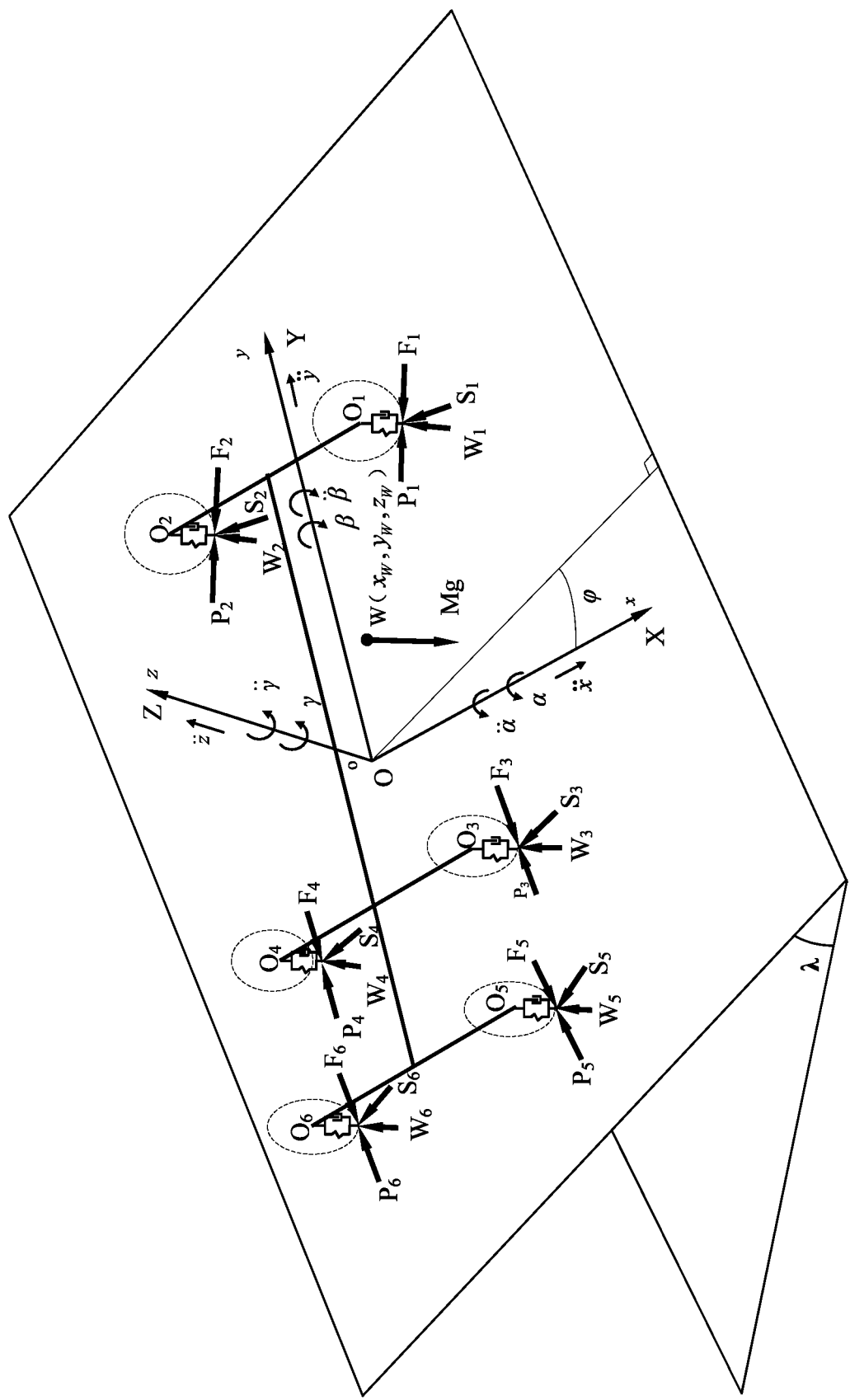
FIG. 3 is a dynamic model schematic diagram of a three-axle passive suspension vehicle driving on a slope plane in the present invention.

2. A Method for Solving the Supporting Force of Each Wheel when the Vehicle is Driving on the Virtual Slope Plane (1) Dynamic Modeling a Three-Axle Passive Suspension Vehicle As shown in FIG. 3, the vehicle is regarded as a rigid body, and the weight of the vehicle is set as M. All suspensions of the vehicle are independent suspensions, and all suspensions have the same structural size and performance. The hardware structure of the suspension system is simplified to a parallel connection of a damper and a spring. The spring is linear and the spring stiffness is $K_Z$. The damping of the damper is viscous damping, and the damping coefficient is $C_Z$. Because the lateral and tangential elasticity and damping of the suspension system have little influence on the dynamic characteristics of the vehicle, the lateral and tangential elasticity and damping of the suspensions are ignored herein. Setting up a right hand coordinate system OXYZ, taking the positive direction of X-axis as a transverse direction of the vehicle to the right, the positive direction of Y-axis as a longitudinal forward direction of the vehicle, and the positive direction of Z-axis as the longitudinal upward direction of the vehicle. The coordinate system is fixedly connected with the slope plane and is a fixed coordinate system. In order to determine the position of the three-axle vehicle in the fixed coordinate system, the vehicle coordinate system oxyz is introduced. The vehicle coordinate system coincides with the fixed coordinate system at their initial positions, and its positioning coordinates in the fixed coordinate system are respectively x, y, z, $\alpha$, $\beta$, $\gamma$.

Setting the coordinate of the center of mass of the vehicle as W $x_W$, $y_W$, $z_W$) in the vehicle coordinate system oxyz, and setting the x and y coordinates of the support point $O_i$ of the suspension numbered i as $b_i$, $L_i$, i=1, 2, ..., 6 in the oxyz coordinate system. Setting the moments of inertia of the vehicle with respect to x, y and z axises as $J_{XX}$, $J_{YY}$ and $J_{ZZ}$, and the products of inertia with respect to x/y, y/z and x/z axises as $J_{XY}$, $J_{YZ}$ and $J_{XZ}$. Setting the 6-dimensional accelerations of the vehicle coordinate system with respect to the fixed coordinate system which are measured by the inertia measurement unit 3 as $\ddot{x}$, $\ddot{y}$, $\ddot{z}$, $\ddot{\alpha}$, $\ddot{\beta}$, $\ddot{\gamma}$, and the measured attitude angles of the vehicle body respectively as $\alpha$ and $\beta$. In order to accurately reflect the influence of slope on the supporting force of each wheel, the concept of slope angle and vehicle driving azimuth angle are introduced: the slope angle is the included angle between the slope plane and the horizontal plane, which is represented by $\lambda$; and the azimuth angle is the included angle between the descent direction of slope gradient and the x-axis of vehicle coordinate system, which is expressed by $\varphi$.

The conversion formulas for calculating $\lambda$ and $\varphi$ from $\alpha$ and $\beta$ are as follows:

$$\lambda = \tan^{-1}\sqrt{T_X^2 + T_Y^2} \quad (1)$$

$$\varphi = \begin{cases} -\tan^{-1}\dfrac{T_X}{T_Y}, \beta > 0 \\ -\dfrac{\pi}{2}\operatorname{sgn}\alpha, \beta = 0 \\ \pi - \tan^{-1}\dfrac{T_X}{T_Y}, \beta < 0 \end{cases} \quad (2)$$

In the formulas, $T_X = \tan\alpha$, $T_Y = \tan\beta/\cos\alpha$.

(2) Solving the Control Target Value of Supporting Force of Each Wheel

In FIG. 3, the driving force, driving resistance, lateral force and supporting force of the wheel numbered i at the ground point of the slope plane are respectively $P_i$, $F_i$, $S_i$, $W_i$, i=1, 2, ..., 6. The following can be obtained by establishing a dynamic equation and solving it:

$$W_i = \{1 L_i - b_i\}[H]^{-1}\{A\}, i=1,2,\ldots,6 \quad (3)$$

Wherein, $$[H] = \begin{bmatrix} 6 & \sum_{i=1}^{6} L_i & -\sum_{i=1}^{6} b_i \\ \sum_{i=1}^{6} L_i & \sum_{i=1}^{6} L_i^2 & -\sum_{i=1}^{6} L_i b_i \\ -\sum_{i=1}^{6} b_i & -\sum_{i=1}^{6} L_i b_i & \sum_{i=1}^{6} b_i^2 \end{bmatrix}$$

$$\{A\} = \begin{Bmatrix} -Mg\cos\lambda - M\ddot{z} - My_W\ddot{\alpha} + Mx_W\ddot{\beta} \\ -Mg(z_W\sin\lambda\sin\varphi + y_W\cos\lambda) + Mz_W\ddot{y} - My_W\ddot{z} - \\ [J_{XX} + M(y_W^2 + z_W^2)]\ddot{\alpha} + (My_Wx_W + J_{XY})\ddot{\beta} + (Mx_Wz_W + J_{XZ})\ddot{\gamma} \\ Mg(z_W\sin\lambda\cos\varphi + x_W\cos\lambda) - Mz_W\ddot{x} + Mx_W\ddot{z} + (J_{XY} + Mx_Wy_W)\ddot{\alpha} - \\ [J_{YY} + M(x_W^2 + z_W^2)]\ddot{\beta} + (J_{YZ} + My_Wz_W)\ddot{\gamma} \end{Bmatrix}$$

It can be seen that $W_i$ is a function of the 6-dimensional acceleration and attitude angle of the vehicle, and is related to the inertia characteristics of the vehicle in the coordinate system oxyz and the position coordinates of the upper supporting point of each suspension in the coordinate system oxyz, but has nothing to do with the stiffness and damping of the suspensions.

3. An Inertial Regulation Method of the Suspension System

The active suspension inertial regulation method of three-axle vehicle based on the supporting force of each wheel is divided into two parts: the inner loop control and the outer loop control.

(1) The Inner Loop Control

First, measuring actual supporting forces $W_i^C$ of all wheel 2-1, 2-2, ..., 2-6 according to the supporting force sensors 6-1, 6-2, ..., 6-6 installed on the suspension oil cylinders, i=1, 2, ..., 6; then, substituting the 6-dimensional accelerations $\ddot{x}$, $\ddot{y}$, $\ddot{z}$, $\ddot{\alpha}$, $\ddot{\beta}$, $\ddot{\gamma}$ and attitude angle $\alpha$ and $\beta$ of the vehicle body in the vehicle coordinate system measured by the inertial measurement unit 3 into the expressions (1), (2) and (3) to obtain the theoretical supporting force $W_i$ that each wheel should bear when the vehicle is driving on the corresponding virtual slope plane, i=1, 2, ..., 6. Using the theoretical supporting force $W_i$ as the control target value of the actual supporting force $W_i^C$ of each wheel, and obtaining the adjustment quantity $\Delta W_i = W_i - W_i^C$ by the difference thereof; obtaining the corresponding suspension oil cylinder displacement after a PID adjustment, and inputting the displacement the servo controllers 7-1, 7-2, ..., 7-6, so as to drive suspension oil cylinders 4-1, 4-2, ..., 4-6 to extend or retract; and making the actual supporting force $W_i^C$ of each wheel change with the supporting force control target value $W_i$ through this control.

(2) The Outer Loop Control

Measuring the stroke w, of each suspension oil cylinder by displacement sensors 5-1, 5-2, ..., 5-6 installed on the suspension oil cylinders, and then calculating the average value $$\overline{w} = \frac{1}{6}\sum_{i=1}^{6} w_i$$

of the strokes of 6 suspension oil cylinders, wherein i=1, 2, ..., 6. Taking the difference $$\delta = \frac{S_0}{2} - \overline{w}$$

between the median value $$\frac{S_0}{2}$$

of the suspension oil cylinder strokes and the above-mentioned mean value of the suspension oil cylinder strokes as the target value of the unified extension and retraction displacement of each suspension oil cylinder to control the stroke of each suspension oil cylinder, so that each suspension oil cylinder carries out the extension or retraction of the same displacement $\delta$. Therefore, the average value of all suspension oil cylinder strokes tends to be the median value $$\frac{S_0}{2}$$

of the suspension oil cylinder strokes, wherein $S_0$ is the maximum stroke of the suspension oil cylinder.

The above-mentioned inner loop control and outer loop control are independent of each other and have no coupling relationship. Although the inner loop control is to control the supporting force of each wheel, it is finally realized by controlling the displacement of the suspension cylinder. Therefore, the inner loop control quantity and the outer loop control quantity are both displacement quantity and can be superimposed together. As shown in FIG. 1, the superposition point is selected to be the input end of the servo controller of each suspension oil cylinder.

4. The Beneficial Effects of Specific Embodiments of the Present Invention

In the following, the solution in which the suspension oil cylinders are shared in the active/passive mode in the first embodiment of the present invention is described with reference to FIG. 4 to FIG. 10. The present invention has passed a practical application test of an emergency rescue vehicle and achieved good using effects.

(1) The Basic Information of the Application

The vehicle used in the present invention is a ladder high sprinkler fire fighting truck, which employs an oil-gas suspension system before adopting the present invention. The active suspension system is not applied in the whole industry of such vehicles in the world, and the oil-gas suspension system is the most advanced suspension system currently applied in the whole industry of such vehicles. After the present invention is adopted, the active suspension system is added on the basis of the original oil-gas suspension system, and the current switchable operating mode of the active/passive suspension is formed. The active suspension system is constructed according to the principle and method of the present invention. It is driven by hydraulic servo and adopts the inertial regulation active suspension technology based on the supporting force of each wheel. The active/passive suspension operating modes can be switched with a switch on the front panel of a driving cab.

The basic parameters of the application vehicle are shown in Table 1.

TABLE 1

| The basic parameters of the application vehicle | |
|---|---|
| Type of vehicle | Ladder high sprinkler firefighting truck |
| Weight of vehicle kg | 29898 |
| Engine model | MC13.48-50 |
| Axle weight kg | 11115/9359/9424 |
| Tire specification | 445/95R25 |
| Type of suspension | Dedicated suspension with active/passive mode switching function |

Figure 4:
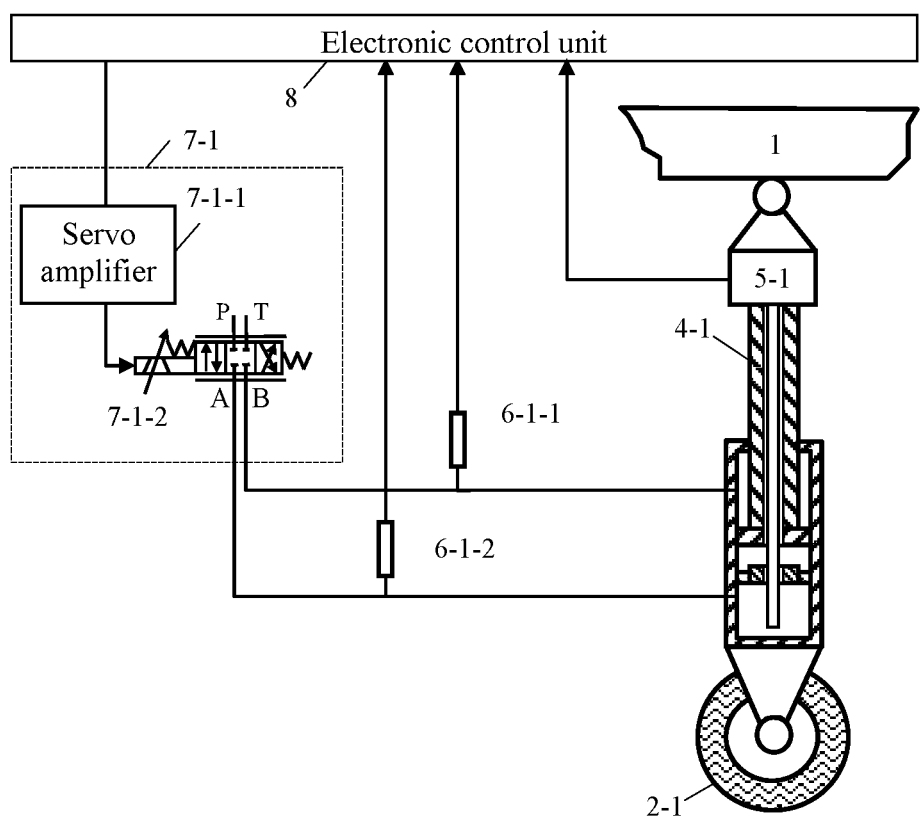
FIG. 4 is a structural schematic diagram of an active/passive mode shared suspension oil cylinder in a first embodiment of the present invention.

The active/passive modes of the vehicle suspension system share the suspension oil cylinders, as shown in FIG. 4. FIG. 4 is a functional and structural schematic diagram of a first wheel suspension oil cylinder of the vehicle, and the other wheel suspension oil cylinders are exactly the same. In the figure, a suspension oil cylinder 4-1 is installed between a vehicle body 1 and a wheel 2-1 and is driven by a servo controller 7-1 composed of a servo amplifier 7-1-1 and a servo valve 7-1-2. A magnetostrictive sensor 5-1 is installed in the piston rod of the suspension oil cylinder 4-1. In order to measure the supporting force of the wheel, pressure sensors 6-1-1 and 6-1-2 are respectively installed in a rod-free cavity connected oil line A and a rod cavity connected oil line B of the suspension oil cylinder. The supporting force of the suspension oil cylinder can be calculated according to an oil line pressure measured by the two pressure sensors and the area of the rod cavity and rod-free cavity of the suspension oil cylinder. On this basis, the actual supporting force of each wheel can be calculated according to a specific force transfer relationship of the suspension connecting rod mechanism.

(2) Determination of a Test Solution

The test project is mainly to compare driving comfort and handling stability under the two suspension modes. The specific test project is as follows.

(2.1) Driving Comfort Test

Figure 5:
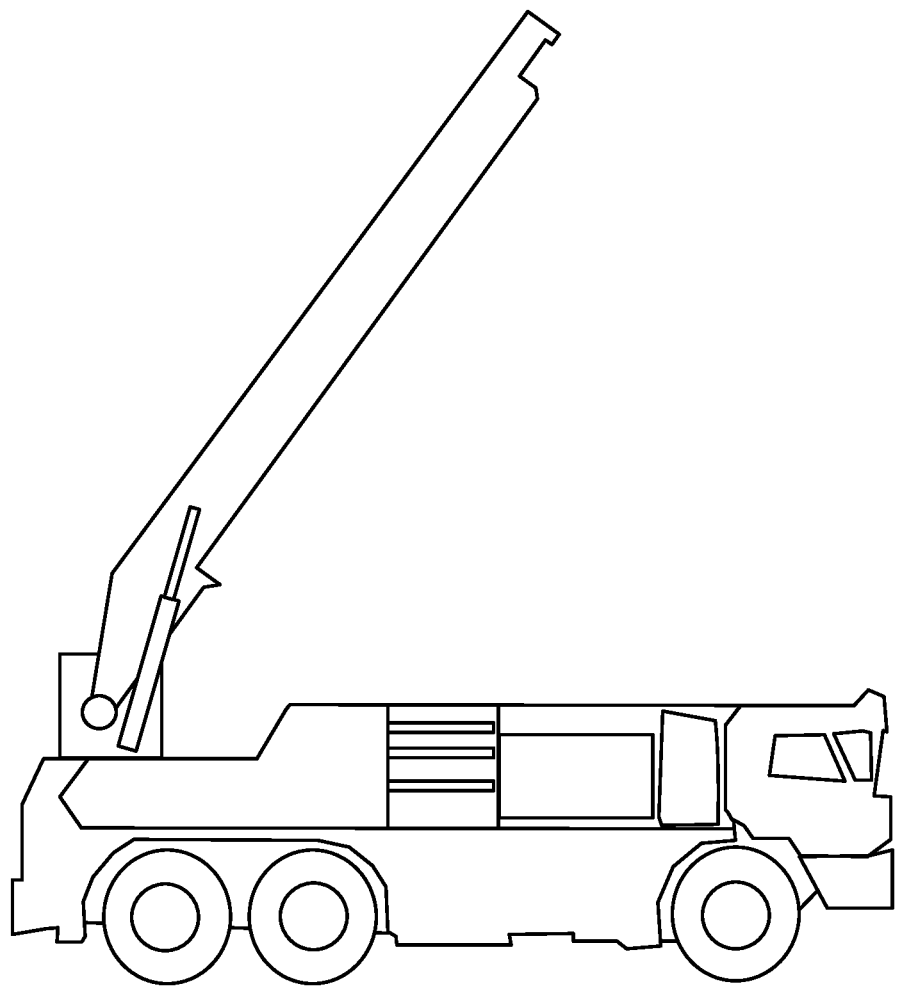
FIG. 5 is a schematic diagram of a lifting arm running mode of a test vehicle in the first embodiment of the present invention.
Figure 7:
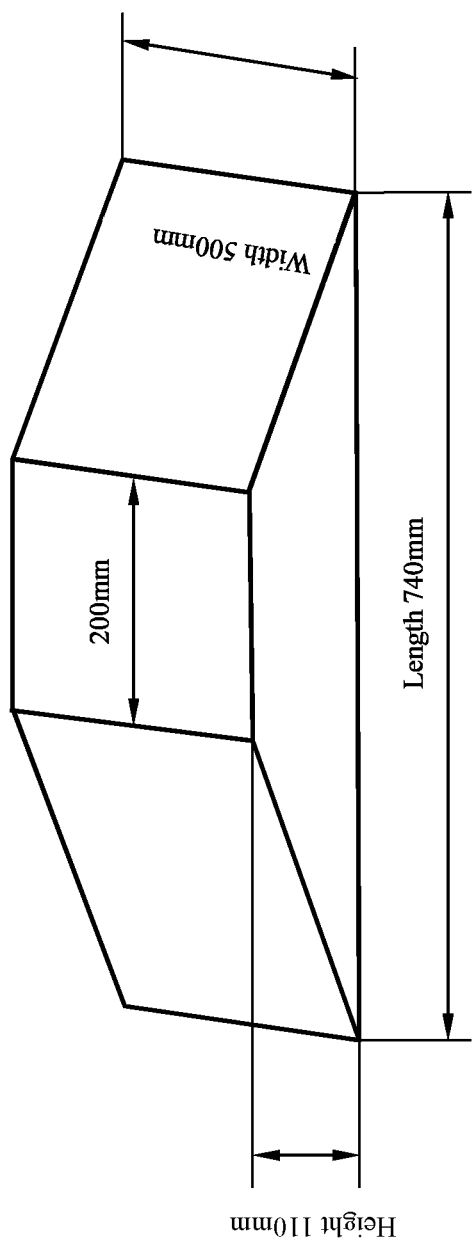
FIG. 7 is a structural schematic diagram of a triangular convex block used as a road barrier in the first embodiment of the present invention.
Figure 8:
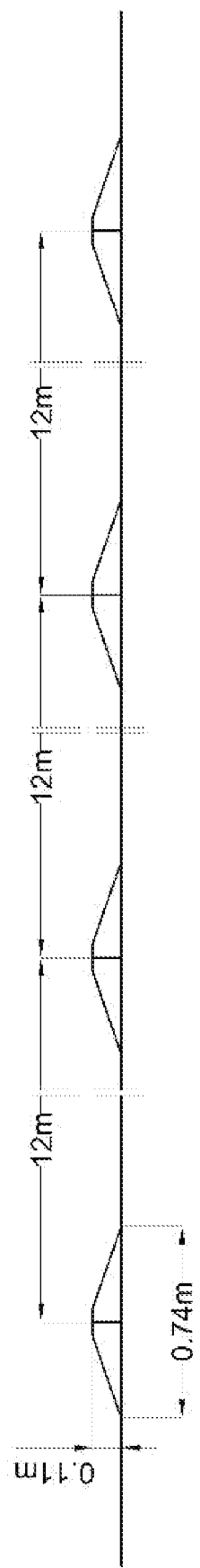
FIG. 8 is a triangular convex block arrangement under the condition of unilateral continuous barrier crossing in the first embodiment of the present invention.
Figure 9:
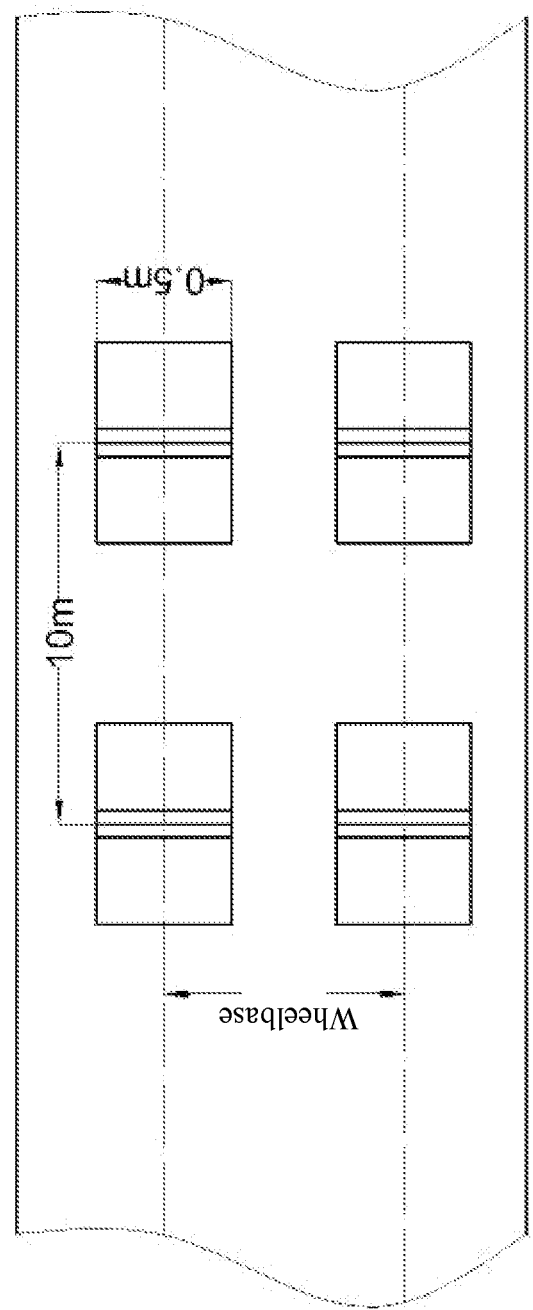
FIG. 9 is a triangular convex block arrangement under the condition of bilateral continuous barrier crossing in the first embodiment of the present invention.
Figure 10:
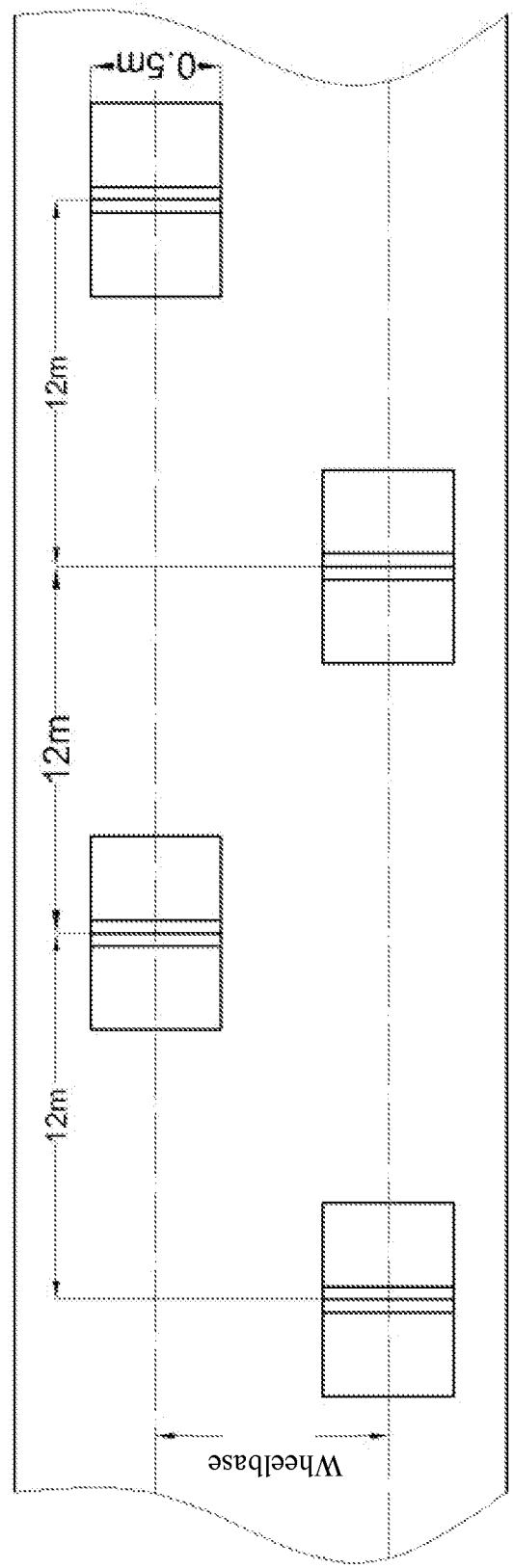
FIG. 10 is a triangular convex block arrangement under the condition of bilateral staggering barrier crossing in the first embodiment of the present invention.

For the vehicle, the driving comfort test is carried out in the active suspension mode and the passive suspension mode respectively, and the root mean square values of the combined total weighted accelerations are respectively calculated and compared with each other. At the same time, the vehicle body attitude angles when the vehicle crosses a barrier are tested and compared with each other. During the test, the vehicle is in a lifting arm running mode as shown in FIG. 5. The road excitation to the tire is realized by setting a triangular convex block barrier on a common cement road surface. The triangular convex block barrier is as shown in FIG. 7.

The test has three working conditions: unilateral continuous wheel crossing over the triangular convex block barrier, bilateral continuous crossing over the triangular convex block barrier and bilateral staggering crossing over the triangular convex block barrier. The triangular convex block arrangements in all working condition are respectively shown in FIG. 8, FIG. 9 and FIG. 10.

(2.2) A Steady State Rotation Test for the Handling Stability

Figure 6:
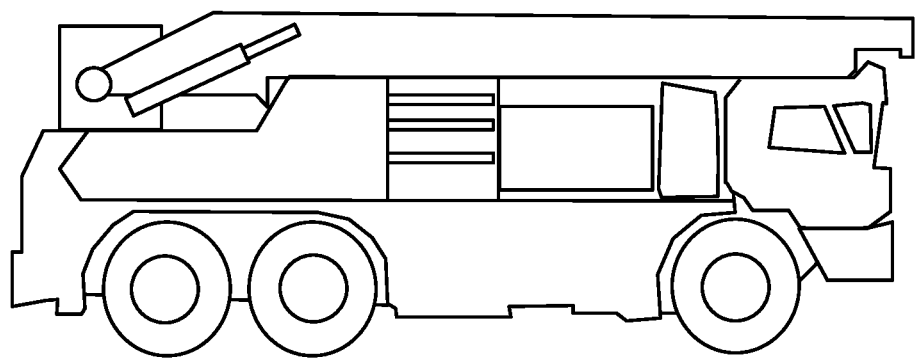
FIG. 6 is a schematic diagram of a falling arm running mode of a test vehicle in the first embodiment of the present invention.

For the vehicle, the steady state rotation test of handling stability is carried out in the active suspension mode and the passive suspension mode respectively, and the corresponding roll degrees of the vehicle body are calculated and compared with each other. During the test, the vehicle is in a falling arm running mode as shown in FIG. 6. The test is not carried out in the lifting arm running mode because steering at a high speed in a hydro-pneumatic suspension mode could cause the vehicle to tip over.

(2.3) An Emergency Braking Test for the Handling Stability

The emergency braking test is carried out when the vehicle is driving in a straight line at a speed of 5 km/h under the two modes of active suspension and passive hydro-pneumatic suspension respectively. The pitch angles of the vehicle body are tested and compared with each other. During the test, the vehicle is in a lifting arm running mode as shown in FIG. 5.

(3) Test Results

The test is carried out according to the above-mentioned test solution, and the test results and conclusions are as follows.

(3.1) Test results, see Table 2, Table 3 and Table 4.

(3.2) Conclusions of Test

Compared with the original hydro-pneumatic suspension, the driving comfort and handling stability of the active suspension of the present invention are significantly improved under typical driving conditions.

(3.2.1) In the driving comfort test, the root mean square of accelerations of the active suspension decreases by 32.4% compared with the passive hydro-pneumatic suspension when crossing the triangle barrier. The average roll angle of the vehicle body decreases by 34.5% when the unilateral wheels pass the triangle barrier, and the average pitch angle of the vehicle body decreases by 25.7% when the bilateral wheels pass the triangle barrier.

(3.2.2) In the steady state rotation test for the handling stability, the roll degree of the vehicle body of the active suspension is reduced by 40.8% in left turn and 51.2% in right turn compared with the passive hydro-pneumatic suspension.

(3.2.3) In the emergency braking test for the handling stability, the pitch angle of the vehicle body of the active suspension is reduced by 64.6% compared with the passive hydro-pneumatic suspension.

suring the pressure of the two cavities of the suspension oil cylinder. The advantage is that the structure form and size of the original hydro-pneumatic suspension oil cylinder are not changed. It should be noted that due to the friction of the oil cylinder, there would be a certain error in the calculated supporting force of the wheel.

TABLE 2

Results of driving comfort test

| Test project | Test conditions | Position of test | Root mean square values of combined total weighted accelerations (m/s$^2$) | | | Average attitude angle of vehicle body (°) | | |
|---|---|---|---|---|---|---|---|---|
| | | | Passive mode | Active mode | Performance improvement | Passive mode | Active mode | Performance improvement |
| Driving comfort test | Unilateral continuous wheel crossing over triangular barrier | Above seat cushion Lazyback Foot floor | 0.61 | 0.41 | 32.4% | 2.38 | 1.56 | 34.5% |
| | Bilateral continuous wheel crossing over triangular barrier | Above seat cushion Lazyback Foot floor | 1.05 | 0.72 | 31.7% | 2.34 | 1.74 | 25.7% |
| | Bilateral wheel staggering crossing over triangular barrier | Above seat cushion Lazyback Foot floor | 0.52 | 0.43 | 17.8% | 2.57 | 1.74 | 32.3% |
| Note | (1) The fire fighting truck is in a lifting arm running mode with a speed of 3 km/h. (2) Average attitude angle of the vehicle body: testing the roll angle of the vehicle body by unilateral continuous wheel crossing over triangular barrier; testing the pitch angle of the vehicle body by bilateral continuous wheel crossing over triangular barrier; and testing the roll angle of the vehicle body by bilateral wheel staggering crossing over triangular barrier. | | | | | | | |

TABLE 3

Results of steady state rotation test for handling stability

| Test project | Direction | Roll degree of vehicle body[(°)/(m/s$^2$)] | | Performance improvement |
|---|---|---|---|---|
| | | Passive mode | Active mode | |
| Steady state rotation test for handling stability (Centrifugal acceleration = 2 m/s$^2$) | Left turn | 0.76 | 0.45 | 40.8% |
| | Right turn | 0.82 | 0.40 | 51.2% |

TABLE 4

Emergency braking test results of handling stability

| Test project | Direction | Peak pitch angle of vehicle body (°) | | Performance improvement |
|---|---|---|---|---|
| | | Passive mode | Active mode | |
| Emergency braking test for handling stability (Braking is started at 5 km/h) | Straight line | 0.975 | 0.345 | 64.6% |

Figure 11:
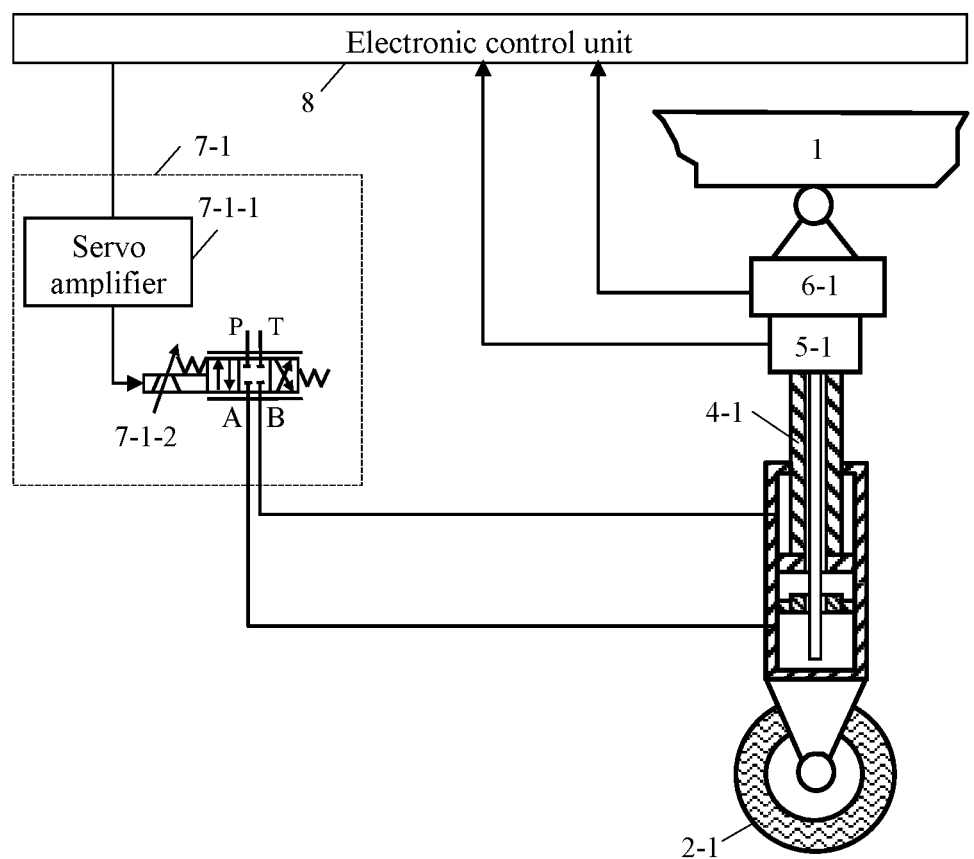
FIG. 11 is a structural schematic diagram of an active suspension oil cylinder in a second embodiment of the present invention.

The using effects obtained by the above test is based on the function and structure of the suspension oil cylinder in the first embodiment of the present invention shown in FIG. 4. It calculates the supporting force of the wheel by mea- In an alternative solution, that is, in the second embodiment of the present invention as shown in FIG. 11, a tension-compression sensor 6-1 is installed at the end of the suspension oil cylinder connected to the vehicle body to measure the supporting force of the wheel, and the measuring accuracy of the supporting force of the wheel can reach less than 1% after the test. The suspension oil cylinder in FIG. 11 can overcome the problem that there is a certain error in the supporting force of the wheel calculated in the first embodiment due to the friction of the oil cylinder, and the suspension control performance can be further improved. It should be noted that in the second embodiment of the present invention, the structure of the suspension oil cylinder and even the supporting position of the supporting point on the suspension oil cylinder need to be changed, and a certain installation space is required.

In the description of this specification, the reference terms such as "an embodiment", "some embodiments", "examples", "specific examples", or "some examples" are used to mean that the specific features, structures, materials or characteristics described in conjunction with such embodiments or examples are contained in at least one embodiment or example of the present invention. In this specification, schematic representations of the above terms do not necessarily refer to identical embodiments or examples. Furthermore, the specific features, structures, materials or characteristics of the description may be combined in an appropriate manner in any one or more embodiments or examples.

In the above, the implementations of the present invention are described. However, the present invention is not limited to the above implementations. Any modification, equivalent replacement, improvement, etc. made within the spirit and principles of the present invention shall be comprised in the protection scope of the present invention.

What is claimed is:

1. An inertial regulation method for active suspension based on a supporting force of each wheel, wherein the method comprises:
    adjusting the supporting force of each wheel and controlling expansion of each suspension cylinder to control a resultant force received by a vehicle in a vertical direction, so that respective resultant torques around a longitudinal axis and a horizontal axis passing through a center of mass are equal to zero;
    keeping the center of mass of the vehicle moving along a straight line or smooth curve; and
    keeping an attitude of the vehicle stable;
    wherein the inertial regulation method further comprises an inner loop control step and an outer loop control step, wherein the inner loop control step is used to control the supporting force of each wheel, and the outer loop control step is used to control an average value of all suspension cylinder strokes, the inner loop control step and the outer loop control step are independent of each other and have no coupling relationship;
    wherein the outer loop control step comprises: calculating the average value of all the suspension cylinder strokes based on each measured suspension cylinder stroke, comparing the average value of all the suspension cylinder strokes with a median value of the suspension cylinder strokes, taking the difference thereof as a target displacement, and controlling each suspension cylinder for the same expansion of displacement, so that the average value of all the suspension cylinder strokes tends to the median value.

2. The inertial regulation method according to claim 1, wherein the inner loop control step comprises, calculating according to the dynamics, a theoretical supporting force $W_i$ that each wheel should bear when the vehicle is driving on a virtual slope plane with a 6-dimensional acceleration, pitch angle and roll angle measured by an inertial measurement unit, which is taken as a control target value of supporting force of each wheel; comparing the theoretical supporting force with the measured supporting force $W_i^C$ of each wheel; and inputting the difference $\Delta W_i = W_i - W_i^C$ thereof to a servo controller as an adjustment quantity to control the expansion of the suspension cylinder, so that the supporting force of each wheel changes according to the theoretical supporting force $W_i$ wherein i=1, 2, ... m, m is the number of wheels.

3. The inertial regulation method according to claim 1, wherein the inner loop control step and outer loop control step are finally realized by controlling the displacement of each suspension cylinder, the displacement of each suspension cylinder in the inner loop control step and the displacement of each suspension cylinder in the outer loop control step are superimposed together at an input end of the servo controller of each suspension cylinder.

4. A control system applying the inertial regulation method vehicle active suspension based on a supporting force of each wheel according to claim 2, wherein the system comprises a vehicle body (1), m wheels (2-1, 2-2, ..., 2-m), an inertial measurement unit (3), suspension cylinders (4-1, 4-2, ..., 4-m) corresponding to the wheels and displacement sensors (5-1, 5-2, ..., 5-m) and supporting force sensors (6-1, 6-2, ..., 6-m), servo controllers (7-1, 7-2, ..., 7-m), and an electronic control unit (8), wherein the displacement sensors (5-1, 5-2, ..., 5-m) and the supporting force sensors (6-1, 6-2, ..., 6-m) are respectively installed in the suspension cylinders (4-1, 4-2, ..., 4-m) and are used to measure the stroke and supporting force of each suspension cylinder; the electronic control unit (8) is communicatively connected with the inertial measurement unit (3), the displacement sensors (5-1, 5-2, ..., 5-m) and the supporting force sensors (6-1, 6-2, ..., 6-m) on the suspension cylinders and the servo controllers (7-1, 7-2, ..., 7-m); the servo controllers (7-1, 7-2, ..., 7-m) are respectively connected with the suspension cylinders (4-1, 4-2, ..., 4-m) to drive the suspension cylinders.

5. The control system according to claim 4, wherein the supporting force sensors are installed at positions where the suspension cylinders are connected with the vehicle body; or a supporting force sensor is installed on each of a rod cavity loop and a rod-free cavity loop of the suspension oil cylinder/gas cylinder.

6. A control system applying the inertial regulation method according to claim 1, wherein the system comprises a vehicle body (1), m wheels (2-1, 2-2, ..., 2-m), an inertial measurement unit (3), suspension cylinders (4-1, 4-2, ..., 4-m) corresponding to the wheels and displacement sensors (5-1, 5-2, ..., 5-m) and supporting force sensors (6-1, 6-2, ..., 6-m), servo controllers (7-1, 7-2, ..., 7-m), and an electronic control unit (8), wherein the displacement sensors (5-1, 5-2, ..., 5-m) and the supporting force sensors (6-1, 6-2, ..., 6-m) are respectively installed in the suspension cylinders (4-1, 4-2, ..., 4-m) and are used to measure the stroke and supporting force of each suspension cylinder; the electronic control unit (8) is communicatively connected with the inertial measurement unit (3), the displacement sensors (5-1, 5-2, ..., 5-m) and the supporting force sensors (6-1, 6-2, ..., 6-m) on the suspension cylinders and the servo controllers (7-1, 7-2, ..., 7-m); the servo controllers (7-1, 7-2, ..., 7-m) are respectively connected with the suspension cylinders (4-1, 4-2, ..., 4-m) to drive the suspension cylinders.

7. The control system according to claim 6, wherein the supporting force sensors are installed at positions where the suspension cylinders are connected with the vehicle body; or a supporting force sensor is installed on each of a rod cavity loop and a rod-free cavity loop of the suspension oil cylinder/gas cylinder.

8. A control system applying the inertial regulation method according to claim 3, wherein the system comprises a vehicle body (1), m wheels (2-1, 2-2, . . . , 2-$m$), an inertial measurement unit (3), suspension cylinders (4-1, 4-2, . . . , 4-$m$) corresponding to the wheels and displacement sensors (5-1, 5-2, . . . , 5-$m$) and supporting force sensors (6-1, 6-2, . . . , 6-$m$), servo controllers (7-1, 7-2, . . . , 7-$m$), and an electronic control unit (8), wherein the displacement sensors (5-1, 5-2, . . . , 5-$m$) and the supporting force sensors (6-1, 6-2, . . . , 6-$m$) are respectively installed in the suspension cylinders (4-1, 4-2, . . . , 4-$m$) and are used to measure the stroke and supporting force of each suspension cylinder; the electronic control unit (8) is communicatively connected with the inertial measurement unit (3), the displacement sensors (5-1, 5-2, . . . , 5-$m$) and the supporting force sensors (6-1, 6-2, . . . , 6-$m$) on the suspension cylinders and the servo controllers (7-1, 7-2, . . . , 7-$m$); the servo controllers (7-1, 7-2, . . . , 7-$m$) are respectively connected with the suspension cylinders (4-1, 4-2, . . . , 4-$m$) to drive the suspension cylinders.

9. The control system according to claim 8, wherein the supporting force sensors are installed at positions where the suspension cylinders are connected with the vehicle body; or a supporting force sensor is installed on each of a rod cavity loop and a rod-free cavity loop of the suspension oil cylinder/gas cylinder.

* * * * *